UNITED STATES PATENT OFFICE.

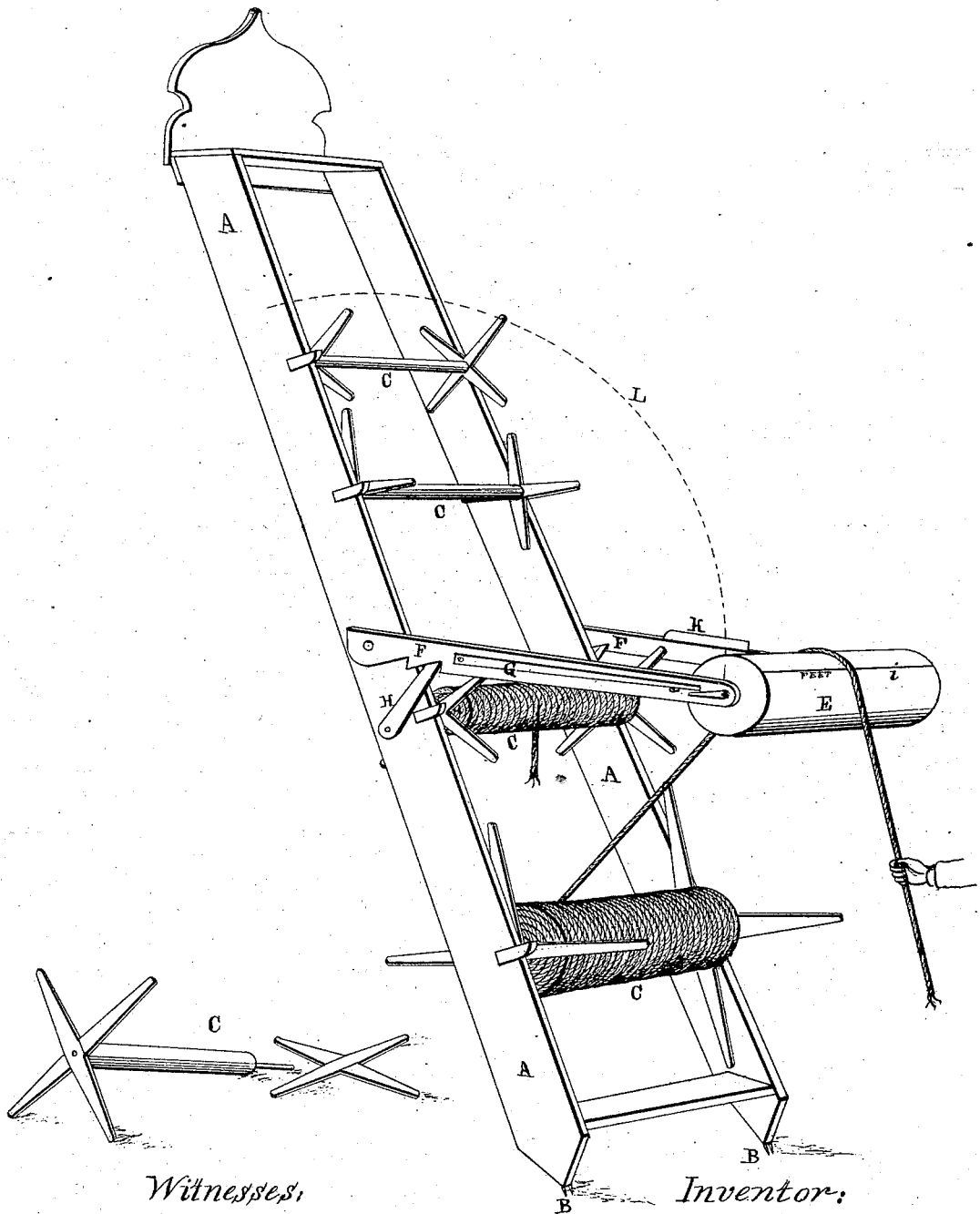

CHARLES HUTCHINGS, OF TOPEKA, KANSAS.

IMPROVEMENT IN ROPE RACKS AND MEASURERS.

Specification forming part of Letters Patent No. 158,088, dated December 22, 1874; application filed April 13, 1874.

*To all whom it may concern:*

Be it known that I, CHARLES HUTCHINGS, of Topeka, Kansas, have invented a Rope Rack and Measurer, of which the following is a specification:

The object of my invention is to render simple, easy, expeditious, and convenient the handling of rope in balls, and the measuring any length thereof desired as drawn from the same. The rack can be made for as many reels as parties ordering desire by making the same with a double set of reels instead of single set, as shown by drawing.

The rack A will lean against any perpendicular object, and the spikes B in the bottom of rack A prevent the same from slipping. C is a detached reel with end removed. It is passed through the hole in the center of the ball of rope, and, the end being replaced, is kept in position by a screw or pin passing through the spindle of the reel C, which is placed in the rack A, revolving in a socket therein. The rope, as drawn from the reel, passes over a revolving cylindrical measure, E. This cylinder can be made of any size desired. The feet and inches on measure E may be painted or otherwise marked thereon. Every revolution thereof will be indicated by spring G on arm F. H is one of the supports to arms F. I is the foot-line on measure E. K is a knife on arm F. The dotted line L shows the path of the measure E when swung back against the rack A after using.

I claim as my invention—

The combination, with a rope-rack, of the revolving cylindrical measure and reel, provided with detachable end, substantially as described.

CHARLES HUTCHINGS.

Witnesses:
PETER D. COOK,
H. G. HOOD.